Patented June 26, 1934

1,964,087

UNITED STATES PATENT OFFICE 1,964,087

PROCESS FOR REFINING HYDROCARBON MATERIALS

William Alvah Smith, Hamburg, N. Y.

No Drawing. Application November 22, 1930, Serial No. 497,612

15 Claims. (Cl. 196—30)

This invention relates to improvements in methods of removing from hydrocarbon mixtures certain objectional ingredients, such as sulphur compounds, gummy constituents and the like.

It has heretofore been common practice to treat hydrocarbon mixtures with various metals and metallic salts for the purpose of forming chemical compounds with certain materials to be removed from these mixtures, and it has also been customary to use materials having adsorptive properties for removing certain ingredients from these mixtures. For example, fuller's earth has been used to remove certain ingredients because of the adsorptive properties of fuller's earth, but fuller's earth as well as other similar adsorptives has certain objections, such for example as increasing the formation of gummy constituents of the hydrocarbon mixture after treatment, and when used in connection with motor fuels, these adsorptives destroy some of the anti-knock properties and in some cases materially increase the end point of the liquid.

The objects of this invention are to provide an improved process for removing from hydrocarbon mixtures certain objectionable gums and gum forming materials; also to provide a process of this kind in accordance with which the hydrocarbon mixtures are treated with a silicate or silicates of copper; also to provide a process of this kind in which a simultaneous removal of sulphur compounds and gummy constituents from hydrocarbon mixtures is effected; also to improve processes of this kind in other respects hereinafter specified, to supply a process for removal of gummy materials after sulphur is removed.

In my co-pending application Serial No. 393,585, filed September 18, 1929, of which this application is a continuation in part, I prescribed the use of copper silicate for the removal of sulphur from petroleum distillates. In accordance with my present invention, copper silicates are employed not only for removing the sulphur compounds from petroleum distillates, but also for removing gummy or gum forming ingredients from any hydrocarbon mixtures, whether the same are in gaseous, vaporous, or liquid form, and if desired, the copper silicate may be used for simultaneously removing sulphur compounds and gummy material from such mixtures.

The manner of carrying out this method may vary according to the mixtures which are being treated, and in accordance with the results desired. In accordance with my method, it is necessary to secure the contact of the mixture to be purified with the copper silicate. If the hydrocarbon material to be treated is in gaseous or vaporous state, the material may be forced through filtration beds formed of copper silicate or by otherwise intimately mixing the finely divided material with vaporized or gasified hydrocarbon. When passing dry gas through this material, it is often desirable to mix the granular or pulverized copper silicate with kerosene or some other convenient liquid to retain the silicate in the treating chamber. In treating hydrocarbon liquids the copper silicate may be added to the liquid, which is then circulated or agitated to secure an intimate mixing of the copper silicate with the liquid. If desired, the liquid may be treated in steps by first subjecting the liquid to a partial treatment by a comparatively small quantity of copper silicate, and then removing the copper silicate and adding additional fresh copper silicate to the liquid. If desired, the copper silicate can be used in conjunction with other treating agents. For example cracked gasoline or pressure distillate may be treated with sodium hydroxide, either liquid or granular, copper hydroxide or other alkaline compound for removal of hydrogen sulfide and the conversion of mercaptans to disulfides. This treatment may be followed effectively by contacting the pressure distillate with copper silicate which removes additional sulfur compounds, gums and gum forming constituents.

The temperature of the material under treatment may be varied as desired, depending upon the results desired and the material under treatment. Ordinary temperatures are of course most convenient but in some cases treatment at elevated temperatures and pressures is desirable. For example, in the manufacture of rubber solvents from Lima crude it is advantageous to treat the solvent with copper silicate at the refluxing temperature of the solvent, to produce a non-corrosive product. In the case of cracked gasoline distillate it is often desirable to carry out the treatment at temperatures below 70° F. to produce water white products.

I have found that various copper silicate compounds may be effectively employed for this purpose. In some cases copper meta silicate can be very effectively used, but I have found that in most cases copper silicates containing a greater amount of silica than the meta silicate are more effective in the removal of gums. Not only do the copper silicates remove gums actually found in the hydrocarbon mixtures, but also some gum forming materials in these mixtures, as well as sulphur compounds. While I do not know just what reactions take place in the carrying out of my process, it is very likely that at least a part, if not all, of the sulphur compounds are removed by reacting chemically with the copper silicate to form sulphur compounds or complexes insoluble in the hydrocarbon mixture. The gums appear to be removed from mixture, because of the adsorbent properties of copper silicate, since in many cases gums may be removed from the copper silicate after treatment of a hydrocarbon mixture by the copper silicate by merely washing the copper silicate with a gum solvent. It is also possible that the copper silicate may have a polymerizing effect upon certain gum forming materials contained in the mixture resulting in the forming of such gums and their removal by adsorption.

After treating a hydrocarbon mixture, the copper silicate may be restored approximately to its original condition for further use in any suitable manner; for example, by heating the copper silicate which has been removed from the mixture, and thus driving off any gummy or gum forming substances adhering to the copper silicate. The copper silicate may also be revivified by subjecting the same after removal from the hydrocarbon mixture to the action of certain organic solvents, such as mixtures of benzol, from which solvents the gums can be recovered, if desired. Other solvents may be used such as acetone, amyl acetate, chloroform, and carbon tetrachloride. If these methods fail to sufficiently revivify the copper silicate, the constituents may be recovered by oxidizing at a sufficiently high temperature to form copper oxide and silica, in which the copper oxide can be recovered by dissolving the same out with acids to form copper salts, or in any other convenient manner.

The most convenient manner of forming the various copper silicates is to cause a reaction between the corresponding sodium or potassium silicates with a water solution of a water soluble copper salt, such for example as copper sulfate, thus forming corresponding copper silicates and sodium or potassium sulfate. Usually these materials in water solution are gelatinous in form, and when dried sufficiently, lose their ability to form gelatinous precipitates when remixed with water. By causing the reaction to take place in a concentrated solution, a substantially non-gelatinous precipitate is formed which can be easily dried. The dried copper silicates are of a granular nature somewhat similar to fine sand, and in this form are much more effective in their action upon dry hydrocarbon mixtures than when in gelatinous form; and, furthermore, the removal of these copper silicates from the hydrocarbon material under treatment can be easily effected by centrifuging, precipitation, filtration, settling or any other desired method which would occur to one skilled in the art, or, if desired, by redistillation. Because of the form of these dried copper silicates, they do not tend to pack in the presence of a hydrocarbon liquid. The silicates may be reduced to powder by grinding.

In localities containing natural copper silicate deposits such as chrysocolla, dioptase and planchette these may be used instead of the artificially made silicates referred to, although the latter are preferred.

In accordance with this process, by treatment of a hydrocarbon mixture with copper silicate, the sulphur compounds, as well as gummy materials, may be removed in the same operation.

As in the case of other treating agents the proportion of copper silicate to hydrocarbon material treated varies with the character and origin of the material as well as with the previous treatment to which the material has been subjected. As an example of the proportion and results obtained from the treatment of 400° F. end point cracked gasoline produced from gas oil derived from Refugio crude oil, the following is illustrative. The cracked distillate which had a copper dish gum of over 600 mg. per 100 c. c., a sulfur content of 0.06%, and a color of 12 was treated in two successive steps for one and one-fourth hour each—first, with 2½ pounds of copper silicate ($CuO$ to $SiO_2$ ratio 1 to 4) per barrel of distillate, and, second with one and one-half pounds of the copper silicate. The treated distillate which was "doctor" sweet and non-corrosive showed the following properties:

Gum (copper dish) _____ 8 mg.per 100 cc.
Color _____ 25 Saybolt
Color (after 3 hours exposure
  to sunlight) _____ 25 Saybolt
Benzol equivalency _____ substantially unchanged
Sulfur _____ 0.04 %

The very unusual results obtained by the treatment of hydrocarbon products which deposit gums, turn sour and go off color on standing may be attributed at least in part to the catalytic action of the copper silicate compound in precipitating, polymerizing or otherwise removing the gums, sulfur compounds and color compounds or the constituents of hydrocarbon material which form such. Other copper compounds previously tried do not have this property or give the results obtained by the use of copper silicate.

Some of the more important advantages of the process of the present invention are: the simplicity and economy of treatment, the finishing of the treated product without raising its end point, without using other treating agents or without rerunning, and in the case of gasolines the very important advantage of not substantially lowering its anti-knock value.

Having described my invention, what is claimed as new is:

1. A process of removing sulphur compounds, gums, and gum forming materials from hydrocarbon mixtures, which includes subjecting the mixtures in fluid form to the action of a copper silicate containing more than one molecule of silica for each molecule of copper.

2. A process of removing sulphur compounds, gums, and gum forming materials from liquid hydrocarbon mixtures, which includes removing sulphur compounds by chemical reaction with copper silicate, polymerizing gum forming materials into gums by means of copper silicate, and removing gums from the liquid by adsorption by said copper silicate.

3. A process of removing gums from hydrocarbon mixtures, which includes subjecting the mixtures in fluid condition to the action of a copper silicate, separating the copper silicate from the mixtures, and then separating the gums from the copper silicate to render the copper silicate re-usable for removal of further gums from hydrocarbon mixtures.

4. A process of removing gums from hydrocarbon mixtures, which includes subjecting the mixtures while in fluid condition to the action of a copper silicate, separating the copper silicate from the mixtures, dissolving the gums from the copper silicate in a solvent, and recovering the gums.

5. The method of removing objectionable ingredients from hydrocarbon mixtures, including reacting upon a silicate of an alkali metal with a water soluble copper salt to form a corresponding copper silicate, drying said copper silicate, and subjecting the hydrocarbon mixtures while in fluid condition to contact with the dried copper silicate.

6. The process of removing objectionable ingredients, such as sulphur compounds, gums, and gum forming materials from fluid hydrocarbon mixtures which includes subjecting such mixtures to intimate contact with copper silicate at a temperature materially below cracking temperatures.

7. The process of removing sulphur compounds, gums and gum forming materials from fluid hydrocarbon mixtures, which includes removing sulphur compounds by chemical reaction with particles of solid copper silicate, polymerizing gum forming materials into gums by means of particles of solid copper silicate, and removing the gums from the mixtures by absorption by particles of said copper silicate.

8. The process of removing objectionable substances, such as sulphur compounds, gums, and gum forming materials from fluid hydrocarbon mixtures which comprises subjecting the mixtures to intimate contact with particles of dry copper silicate.

9. The process of removing objectionable substances, such as sulphur compounds, gums, and gum forming materials from fluid hydrocarbon mixtures which comprises subjecting the mixtures to intimate contact with particles of dry copper silicate, and at a temperature not materially exceeding room temperature.

10. The process of removing objectionable ingredients, such as sulphur compounds, gums, and gum forming materials from fluid hydrocarbon mixtures which includes subjecting such mixtures to intimate contact with a meta silicate of copper.

11. The method of removing objectionable substances, such as sulphur compounds, gums, and gum forming materials from a liquid hydrocarbon motor fuel, without material change in the anti-knock properties of the fuel, which comprises subjecting said fuel to intimate contact with copper silicate.

12. The method of removing objectionable substances, such as sulphur compounds, gums, and gum forming materials from a liquid hydrocarbon motor fuel, without material change in the anti-knock properties of the fuel, which comprises subjecting said fuel to intimate contact with dry particles of copper silicate.

13. The method of removing objectionable substances, such as sulphur compounds, gums, and gum forming materials from a liquid hydrocarbon motor fuel, without material change in the anti-knock properties of the fuel, which comprises subjecting said fuel to intimate contact with copper silicate at temperatures materially below cracking temperatures.

14. The method of removing objectionable substances, such as sulphur compounds, gums, and gum forming materials from a liquid hydrocarbon motor fuel, without material change in the anti-knock properties of the fuel, which comprises subjecting said fuel to intimate contact with copper silicate containing more than one molecule of silica for each molecule of copper.

15. The method of removing objectionable substances, such as sulphur compounds, gums, and gum forming materials from a cracked gasoline distillate, which consists in subjecting said distillate to intimate contact with true copper silicate at a temperature below approximately 70° F., and separting the insolubles from the liquid to produce a water white distillate.

WILLIAM ALVAH SMITH.